March 7, 1967 E. S. LEVY ETAL 3,308,287

PHASE AND D.-C. VOLTAGE ANALOG MULTIPLIER

Filed Oct. 16, 1962 3 Sheets-Sheet 1

INVENTOR.
Ernest S. Levy
Ernst Herzberg

BY Hugh L. Millig

INVENTOR.
Ernest S. Levy
Ernst Herzberg
BY

PHASE AND D.-C. VOLTAGE ANALOG MULTIPLIER

Filed Oct. 16, 1962

*INVENTOR.*
Ernest S. Levy
Ernst Herzberg
BY Hugh L. Miller Jr.

3,308,287
PHASE AND D.-C. VOLTAGE ANALOG MULTIPLIER

Ernest S. Levy and Ernst Herzberg, San Diego, Calif., assignors to Cubic Corporation, San Diego, Calif., a corporation of California Filed Oct. 16, 1962, Ser. No. 230,841
11 Claims. (Cl. 235—194)

The present invention relates to a phase and D.-C. voltage analog multiplier and, more particularly, to an analog multiplier which accepts input information in the form of a D.-C. voltage and the phase difference between a pair of input signals and produces their product which appears as an output D.-C. voltage.

The most common type of analog computers accepts input information in D.-C. voltage form, performs all internal computations with D.-C. voltages, and produces output information in D.-C. voltage form. However, not all analog information required for computer input arises naturally in D.-C. voltage form and, in such cases, must first be converted to D.-C. signals before being acceptable for computer input. One particularly large class of information is that which occurs as the phase difference between a pair of A.-C. signals, generally termed data and reference signals. For example, resolvers produce information in this form, i.e. phase shifted A.-C. signals, as a function of their shaft displacement. Additionally, certain classes of C.W. tracking equipment produce output information representing slant ranges and direction cosines as phase differing signals. Also, conversion of other types of information into phase difference form is oftentimes readily accomplished. For example, binary numbers representing digital information may be converted into phase information by well-known digital counting techniques or, by the technique found in Patent No. 2,991,462, entitled "Phase-to-Digital and Digital-to-Phase Conversion" dated July 4, 1961, to one of the co-inventors of the present application, Eddy Hose and having a common assignee with the present applications. Hence, the general analog computer requirement for D.-C. voltage inputs is not always directly met in actual practice owing to the large class of instrumentation which produces output phase rather than voltage information.

The present invention is concerned with an analog multiplying circuit of extremely high accuracy which may be readily employed in the computing system disclosed in a co-pending application for patent entitled "Phase and D.-C. Voltage Analog Computing System" to Eddy Hose, Serial No. 231,770, filed October 19, 1962, and having a common assignee with the present application. Although the details of this analog computing system are shown and described in considerable detail in the referred to application of patent, it may be briefly stated here, by way of review, that the system accepts input information in both phase difference and D.-C. voltage level form and performs its various computational processes in the same two forms. Additionally, conversion between the two is likewise provided by the system; hence, input information may appear in either form and, output information may be selectively presented in either form, as may be required for various output requirements.

One fundamental circuit in the system described in the copending application for for patent is an analog multiplier circuit which produces an analog D.-C. output signal representing the product of a D.-C. input signal and the information contained in relative durations of a high voltage level to a low voltage level each cycle in an A.-C. input signal and its complement. The multiplying circuit therein disclosed represents a relatively simplified version and it is the exceptional accuracy of the multiplier circuit forming the basis of the present invention which may be used to the best advantage in the system of the co-pending application for providing ultimate computational accuracies for the technique. Considered in its most elementary form, the multiplier unit according to the present invention multiplies the information contained in the phase difference between reference and data input A.-C. signals, and a D.-C. signal, and produces an output D.-C. signal whose value represents the product of the information in its two inputs.

In particular, the D.-C. signal is essentially passed through one path of a resistor and amplifier network, inverted in polarity, and applied, without change of magnitude, to an output filter. In addition, the input D.-C. signal is passed through a second path of the resistor network, doubled in magnitude without effective polarity inversion, and applied to the same output filter. With this arrangement, as described, the output signal, representing the sum of the two signals passed by the network, has the same magnitude and polarity as the input signal, during the interval between consecutive zero-crossings of the reference and data signals. However, during the remaining portion of each cycle, that is, between the consecutive zero-crossings of the data and reference signals, the second path of the resistor network in effectively grounded with only the inverted D.-C. input signal appearing at the output filter, since it is continually passed through the first resistance network path as described.

Hence, when the data signal lags the reference signal by 180°, corresponding to an A.-C. input value of zero, the filter output signal will also be zero since its input will comprise the D.-C. input signal of equally lengthed alternate normal and inverted polarities. As the phase lag of the input A.-C. signals increases from 180° to 360°, the non-inverted, twice magnitude, D.-C. signal is passed for increasingly longer intervals of each cycle and grounded for correspondingly shorter intervals. Accordingly, the filter output D.-C. voltage increases linearly with the noted increase of relative phase shift. On the other hand, as the phase lag decreases from 180° towards 0°, the output D.-C. voltage goes increasingly more negative since the applied non-inverted, twice magnitude D.-C. signal is grounded for relatively greater durations of each A.-C. input signal cycle.

Shorting the second resistor network path to ground is accomplished by employing two paralleled, shunt-connected diode bridges. The input terminals of the two bridges are connected to ground, their output terminals are connected to the second path of the bridge network, and their conduction states are controlled by the reference-data signals' phase difference, In particular, the bridges are operated to couple their respective resistance network output connections to their respective grounded input terminals during the interval between zero-crossings of the data and reference signals. During the remaining portion of each cycle, that is, between reference and data zero-crossings, the diode bridges are effectively disconnected with normal resistor network operation taking place.

A greatly improved computational accuracy is obtained in the multiplying circuit by employing two diode bridges in parallel, rather than a single bridge as would be normally done. In particular, when the first diode bridge is conducting, twice the input voltage must be effectively lowered by the bridge to ground potential. This means that the current flow through one of the bridges' diodes varies as a function of the input voltage and will hence exhibit the well-known diode characteristic of non-linear front voltage drop variation with current. Hence, instead of being reduced to ground potential, the resistor network will be reduced at this point to some indeterminate voltage above ground which would result, if it were the only diode bridge, in an output inaccuracy since this indeterminate voltage will appear at the output filter. However, the second diode bridge need only reduce the first diode bridge's effective ground, i.e. the small amount above ground noted above, down to ground, instead of twice the applied D.-C. voltage as was the case for the first diode bridge. Accordingly, the second diode bridge will operate under a balanced diode conduction condition, and hence act to cancel out the adverse, non-linear diode operation of the first bridge.

It is, accordingly, the principal object of the present invention to provide an electronic analog multiplying circuit capable of receiving input quantities in the form of a D.-C. input signal and the phase difference between a pair of A.-C. signals and producing an output D.-C. signal whose value represents the product of the two input quantities.

Still another object of the present invention is to provide an electronic unit which produces an output D.-C. signal representing the product of the information obtained in an input D.-C. signal and the phase difference between a pair of input A.-C. signals in which the D.-C. signal is both normally passed directly to an output filter and is additionally doubled in amplitude, reversed in polarity, and passed to the same output filter only during the portion of each cycle corresponding to the phase difference between the pair of input A.-C. signals whereby the average signal value produced by the filter represents the product of the input information.

A further object of the present invention is to provide an analog multiplier circuit which produces an output D.-C. signal representing the product of the information contained in an applied D.-C. signal and the phase difference between a pair of A.-C. signals in which the applied D.-C. signal is passed through one resistance path to an output amplifier and filter combination and is doubled in magnitude, inverted in polarity, and passed through a second resistance path to the same amplifier and filter combination in which the second path is effectively shorted to ground during that portion of each A.-C. signal cycle other than the information carrying phase difference interval wherein the averaged filtered output signal constitutes the product of the two input quantities.

Another object of the present invention is to provide an analog multiplier circuit for producing a D.-C. voltage whose value represents the product of the phase difference between a pair of A.-C. input signals and a D.-C. input voltage in which the input D.-C. voltage is doubled in magnitude, and reversed in polarity and applied through one path to an output filter and is applied without change through another path to the output filter, and in which the phase difference between the pair of A.-C. signals is employed to effectively ground the first path hence with the result that the output filter averages the voltages applied to it through the two paths to produce an output signal whose magnitude represents the product of the two input functions.

Still another object of the present invention is to provide an analog multiplier capable of producing an output D.-C. voltage whose value represents the product of the information contained in the phase difference between a pair of input A.-C. signals and an input D.-C. signal in which the A.-C. signal phase difference information is converted into a rectangular waveform A.-C. signal in which the relative duration of one voltage level to the other corresponds to the phase difference information and in which the D.-C. input voltage is normally applied through a first path to an output filter and is additionally inverted in polarity, doubled in amplitude and applied through a second path to the output filter, the second path being lowered substantially to ground potential at a first point by a diode bridge in response to one voltage level of the rectangular waveform A.-C. signal and the near-ground potential of the first point is lowered to ground at a second point by another diode bridge in response to the same one voltage level with the result that the output signal from the filtering means corresponds to the product of the phase difference between the pair of input A.-C. signals and the input D.-C. signal.

Other objects, features and attendant advantages of the present invention will become more apparent to those skilled in the art as the following disclosure is set forth, including a detailed description of a preferred embodiment of the invention as illustrated in the accompanying sheets of drawings, in which.

Figure 1:
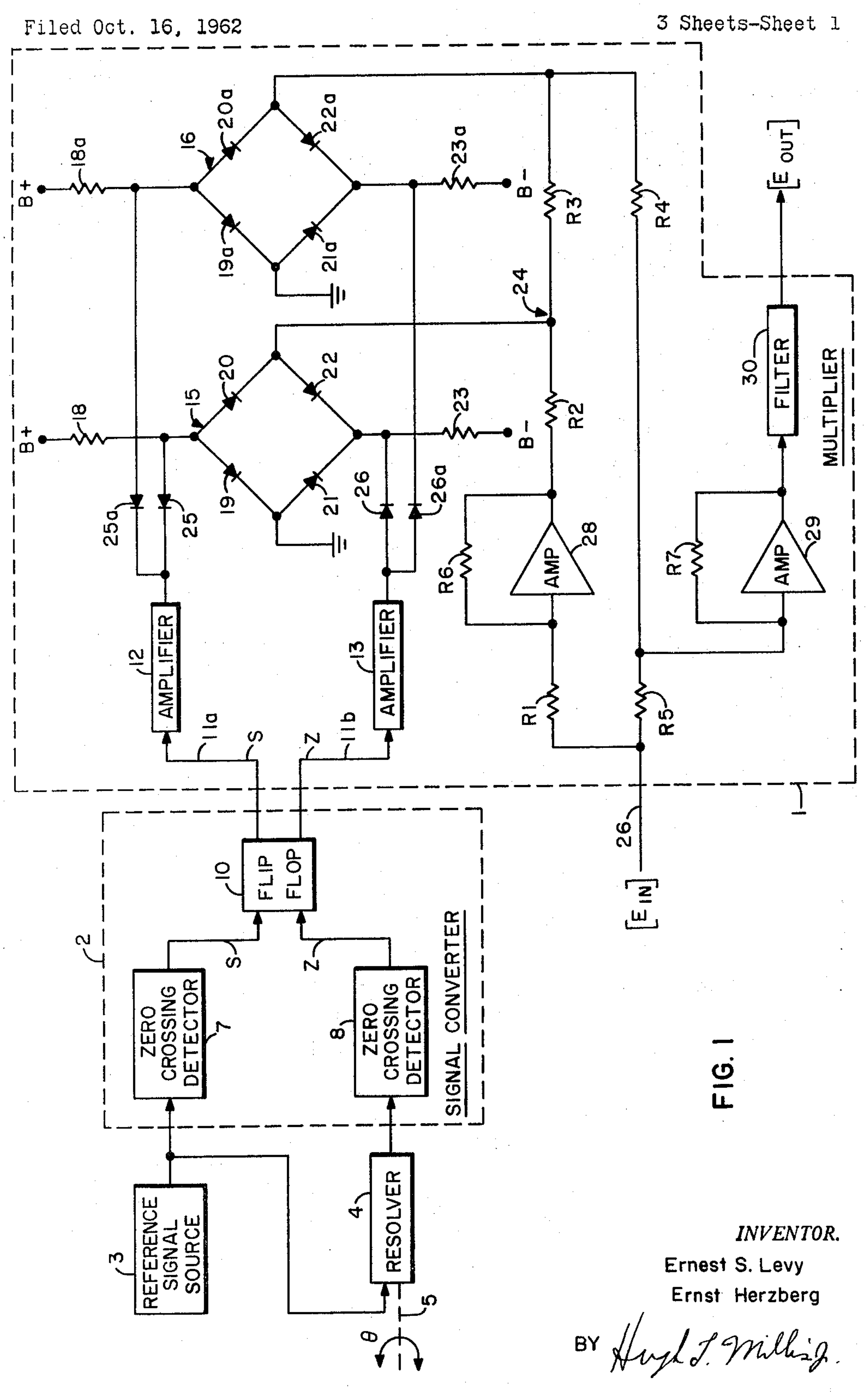
FIGURE 1 is a partly block diagrammatic and partly schematic representation of a D.-C. voltage and A.-C. phase difference multiplier circuit.

Referring now to the drawings, wherein the same elements are given identical numerical designations throughout the several figures, there is illustrated in FIGURE 1 a four-quadrant multiplier 1 according to the present invention. In particular, the output sine-wave signal from an A.-C reference signal source 3 is applied to the input terminal of a first zero-crossing detector 7 within an input signal converter 2 and is additionally passed through a resolver 4, connected as a linear phase shifter, to the input terminal of another zero-crossing detector 8, also within converter 2. Resolver 4 includes an input shaft 5, indicated schematically, which may be given an angular rotation $\theta$, in either direction as indicated, in accordance with some input variable function, not specifically indicated.

The output signals of zero-crossing detectors 7 and 8 are applied, still within converter 2, to the set and zero input terminals, designated S and Z, respectively, of a bistable multivibrator device, such as flip-flop 10. The corresponding pair of output conductors from flip-flop 10, also designated S and Z, for set and zero, respectively, and numbered **11*a* and 11*b*, respectively, constitute the output conductors of converter 2 and are applied to the input terminals of a pair of amplifiers 12 and 13, respectively, within multiplier 1. Multiplier 1 additionally includes a pair of identical diode brdges generally desgnated 15 and 16. Considering bridge 15, for example, a resistor 18 is connected between the B+ terminal of a source of potential, not specifically illustrated, to the common anode terminals of a pair of uni-directional electron flow devices, such as diodes 19 and 20. The cathode of diode 19 is connected both to ground and to the anode of another diode 21. The cathode of diode 20 is connected both to a resistor network, generally designated 24 and described in more detail later, and to the anode of another diode 22. The cathodes of diodes 21 and 22 are connected through a common resistor 23 to the B− terminal of a source of negative potential, not specifically illustrated. Bridge 16 is similar in all respects to bridge 15** and its corresponding components are given the same numerical designations but followed by an *a* to distinguish therefrom.

Amplifier 12 is connected through a diode 25 to the common junction between diodes 19, 20 and resistor 18 of bridge 15 and additionally is connected to the corresponding junction point of bridge 16 through another diode **25*a*. In the same way, amplifier 13 is connected to the common junction of diodes 21, 22 and resistor 23 in bridge 15 through a diode 26 and, additionally, to the corresponding junction in bridge 16 through another diode 26*a***.

The D.-C. input voltage to the multiplier circuit, designated $E_{in}$, appears on an input conductor 26 which branches into upper and lower loops of the resistor network 24. The upper loop includes a serially connected resistor $R_1$, an amplifier 28, a resistor $R_2$, a resistor $R_3$, and a resistor $R_4$, $R_4$ being connected to the input terminal of a final amplifier 29. The lower loop includes only a resistor $R_5$ connected between conductor 26 and the input terminal of amplifier 29. In addition, a feedback resistor $R_6$ is connected between the input and output terminals of amplifier 28 while another feedback resistor $R_7$ is connected between the input and output terminals of amplifier 29.

The output signal of amplifier 29 is passed through a filter 30 to thereby represent the output signal of the multiplier. In particular, the output D.-C. voltage from filter 30 represents, by its magnitude and polarity, the product of the applied D.-C. voltage $E_{in}$ and the phase difference between the pair of signals applied initially to signal converter 2. In particular, the signal produced by reference signal source 3 is displaced in phase by resolver 4 an amount proportional to $\theta$, the angular displacement of resolver shaft 5. Each of the zero-crossing detectors within signal converter 2 detects the instant that its applied signal crosses zero magnitude in a positive going direction and acts to produce a corresponding output triggering signal which, in turn, is applied to its associated input terminal of flip-flop 10. Hence, each time the reference signal on conductor 5 crosses zero positively, flip-flop 10 is set to its "on" or "1" condition, which is represented for the purposes of discussion, by a relatively high voltage output signal level on its S output terminal. Then, following this action, whenever the resolver phase displaced or data signal crosses zero positively, flip-flop 10 will receive a triggering signal on its zero input terminal from detector 8 with the result that its output S conductor signal will go "off" or "0," as represented by a relatively low output voltage level. Hence, the S output signal from flip-flop 10 will be high during each reference signal cycle corresponding to the phase lag of the data signal.

Amplifiers 12 and 13 are employed for impedance matching purposes and for stabilizing the output signals of the flip-flop to a highly constant, predetermined value. In addition, the output voltage levels produced by these amplifiers will be inverted in polarity from their input signals, coming from flip-flop 10, as shown later in FIGURE 2. Considering now the action of the pair of diode bridges, whenever flip-flop 10 is "off," the inverted voltages produced by amplifiers 12 and 13, of relatively high and low levels, respectively, act to effectively disconnect the amplifiers from the two bridges by the back biasing of diodes 25, 25*a*, 26, and 26*a*. This results in a current flow through the bridge diodes between the B+ and B− terminals. Since the common junction of diodes 19 and 21 is grounded, the common junction between diodes 20 and 22 connected to the resistor network 24 is also grounded. This grounding action also occurs simultaneously in the other diode bridge 16.

On the other hand, when flip-flop 10 is "on" the amplifier 12 and 13 signals are at relatively low and high levels, respectively, and current will flow from amplifier 12 through diodes 25 and 25*a* to the B+ terminal and also from amplifier 13 through diodes 26 and 26*a* to the B− terminal. When this action occurs, the diodes in the two bridges are effectively back biased with the result that the junction points in the bridges connected to resistor network 24 are both floating and hence do not alter the normal ungrounded action of the resistor network.

Consider now the operation of resistor network 24. Assume, first of all, that resistors $R_1$ and $R_6$ are of the same value with the result that amplifier 28 has unity gain and acts to invert the input $E_{in}$ voltage. On the other hand, assume that the sum of the values of resistor $R_2$, $R_3$, and $R_4$, are arranged to have one-half the value of resistor $R_5$, with $R_7$ being the same as $R_5$. With this arrangement it is seen that the voltage produced at the output of the upper loop appearing across resistor $R_4$ will produce twice the output voltage from amplifier 29 as will the same voltage appearing as the output of the lower loop appearing across resistor $R_5$. Accordingly, when the diode bridge is effectively out of the circuit as it is when the output signals from amplifiers 12 and 13 are relatively low and high, respectively, corresponding to flip-flop 10 being "on," $+2E_{in}$ will be produced by amplifier 29 in response to the signal from the upper loop and only $-E_{in}$ in response to the lower loop output signal, recalling that amplifier 29 inverts the polarity of its applied input signals. This action will result in the final summed voltage appearing at the output of amplifier 29 being $+E_{in}$.

On the other hand, whenever flip-flop 10 is "off," the output terminals of the bridge circuits are effectively grounded hence grounding the common junction between resistors $R_2$ and $R_3$ and between $R_3$ and $R_4$. Hence, the only signal appearing at the input of amplifier 29 is that coming through resistor $R_5$ from the input terminal. During this condition, the output of the amplifier will correspond to the $-E_{in}$, as explained earlier. In summary then, the signal applied by amplifier 29 to filter 30 will alternate between $+E_{in}$ and $-_{in}$ corresponding to the "on" and "off" states of flip-flop 10. Since flip-flop 10, as described earlier, is triggered to correspond to the phase difference between the reference and data input signals, the alternating output signal from amplifier 29 has positive and negative portions whose relative durations correspond to the input phase difference. Since the magnitude of the positive and negative portions of this signal correspond to $E_{in}$, one of the multiplication factors, it is apparent that the smoothed or averaged output signal of the filter corresponds to the product of the input phase difference and the $E_{in}$ D.-C. voltage.

Figure 2:
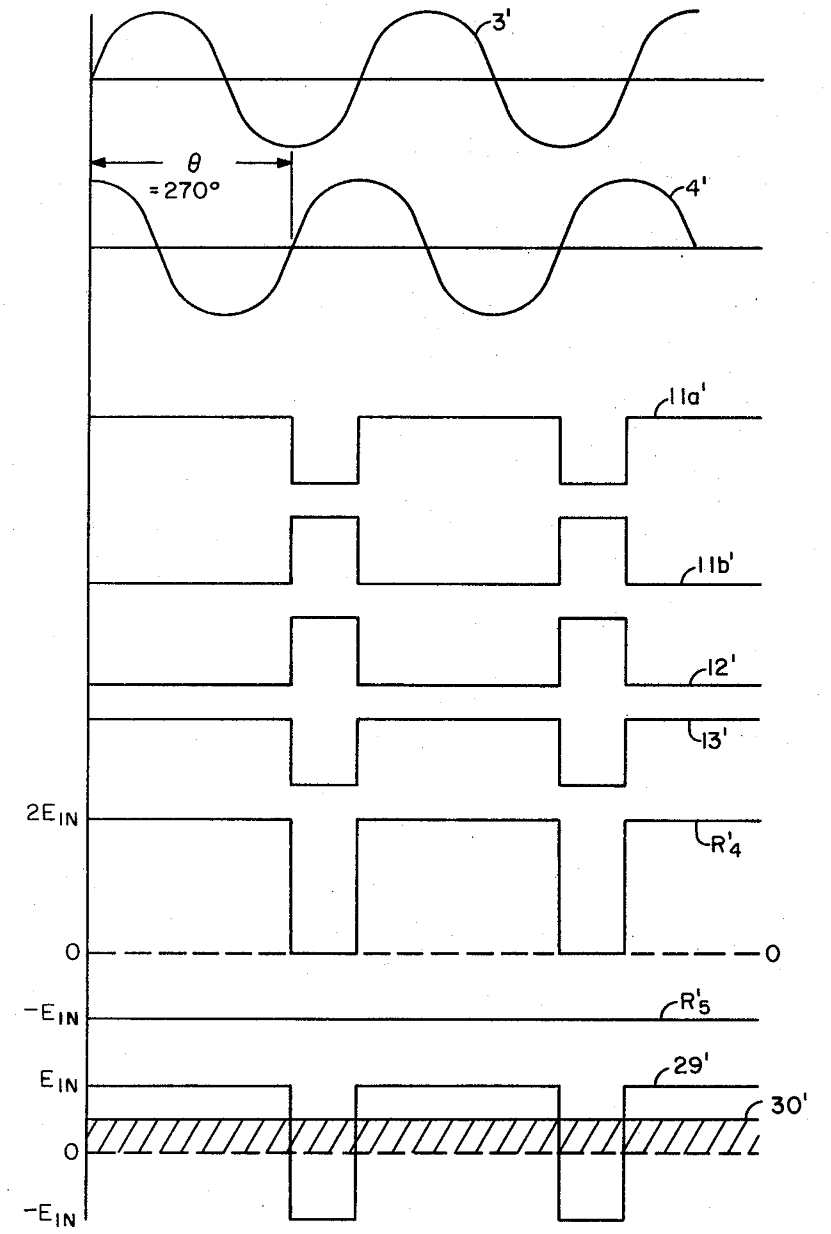
FIGURE 2 is a group of waveforms illustrating the operation of the FIGURE 1 multiplier.

A group of illustrative signal waveforms are set forth in FIGURE 2 for more fully showing the operation of the FIGURE 1 multiplier. In the figure, waveform 3′ represents the output signal from reference signal source 3. Signal 4′ is illustrated for a $\theta$ of 270°, this particular phase delay magnitude being shown for purposes of example only. Waveform 11*a′* represents the S output signal of flip-flop 10 appearing on conductor 11*a* and, as will be noted, goes to its relatively high voltage level at each positive zero-crossing of waveform 3′. Signal 11*a′* goes low at each positive zero-crossing of signal 4′ with the result that the high voltage level in waveform 11*a′* corresponds to the phase delay between signals 3′ and 4′, or 270°. Signal 11*b′* is complementary to signal 11*a′* and is the signal appearing on the Z output terminal of flip-flop 10, or conductor 11*b*. Signals 12′ and 13′ are the respective output signals of amplifiers 12 and 13 and hence are inverted in polarity from their associated signals 11*a′* and 11*b′*, respectively.

Signal $R_4'$ represents the output signal component from amplifier 29 based on its input signal amplitude coming from the upper loop of resistor network 24. As described previously, and as will be observed from the figure, $R_4'$ is at $+2E_{in}$ during the "on" time of signal 11*a′* and falls to ground or zero magnitude during the "off" time of signal 11*a′*. Signal $R_5'$ represents the output voltage component of amplifier 29 owing to the portion of its input signal coming from the bottom loop of network 24, i.e. the $E_{in}$ input signal. As will be observed, it will remain at a steady $-E_{in}$ value, the inverted polarity of $E_{in}$. Signal 29′ represents the composite or summed values of signals $R_4'$ and $R_5'$ and hence constitutes the output signal of the amplifier. The final signal waveform 30′ is the multiplier output or product signal, $E_{out}$, coming from filter 30 and represents the averaged value of signal 29′ produced by the filtering action of filter 30.

Figure 3:
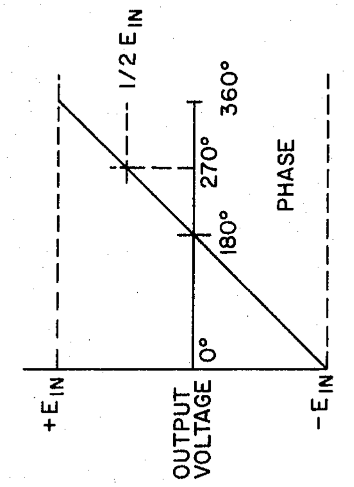
FIGURE 3 is a plot of the input phase difference versus the output voltage produced by the multiplier.

FIGURE 3 is a plot of the output voltage versus the phase displacement between the reference and data signals for a constant $E_{in}$ voltage. As illustrated, a 270° phase displacement, corresponding to the FIGURE 2 waveforms, gives an output voltage of ½ $E_{in}$. For a 180° displacement, the output voltage is zero, and as the displacement increases, that is, goes from 180° to 360°, the "on"

time of signal 11*a'* increases linearly with phase with the result that the output voltage rises linearly to a maximum value, corresponding to $E_{in}$, at 360°. In the same way, as the phase displacement goes negatively from this 180° reference point toward 0°, the "off" time of waveform 11*a'* is longer than the "on" time and a negative output voltage results since the $-E_{in}$ intervals in waveform 29' will be relatively longer than the $+E_{in}$ intervals. At zero phase displacement, waveform 29' is continuously at $-E_{in}$ or of equal magnitude to, but of opposite polarity from, the input voltage. As shown in the preferred embodiment, the inverted signal is twice the D.C. input voltage and, accordingly, the output voltage ranges between plus and minus $E_{in}$. A phase difference of 180° is therefore represented by an output voltage of 0 v. In alternative embodiments, however, other scaling factors could be used to change the output range or the base line. For example, if the output voltage ranges between 0 v. and $+E_{in}$ volts, then a phase difference of 180° would be represented by a voltage equal to $\frac{1}{2}E_{in}$, assuming the system had the response characteristics illustrated by the graph of FIG. 3. Similarly, a 90° phase difference would be represented by an output voltage of $\frac{1}{4}E_{in}$ and a 270° phase difference would be represented by a voltage of $\frac{3}{4}E_{in}$.

In still other embodiments, different scaling factors could be employed without departing from the present invention.

The employment of two parallel diode bridges in the FIGURE 1 multiplier enables the overall output accuracy of the multiplication process to be substantially improved. This improvement in accuracy is best explained by considering FIGURE 4 which illustrates, schematically, the circuit equivalent of the pair of diode bridges. In particular, bridge 15 may be replaced by a single-pole, single-throw switch 15*a* in series between the junction point between resistors $R_2$ and $R_3$, and a non-linear resistor $R_{15}$, in turn connected to ground.

The arrow through resistor $R_{15}$ serves to represent the general non-linear forward conduction characteristic of solid state diodes. That is, the voltage drop across a diode varies non-linearly with the current through it. In the same way switch 16 and series resistor $R_{16}$ represent the circuit equivalent of the other diode bridge 16, connected between resistor $R_3$ and ground.

Figure 4:
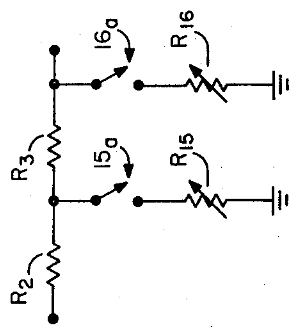
FIGURE 4 is an electronic circuit representation of the action of a pair of shunt-connected diode bridges.

In explaining the circuit accuracy improvement effected by this arrangement, consider first of all the FIGURE 4 circuit as involving only resistor $R_2$, switch 15*a* and resistor $R_{15}$, in turn, representing a single bridge only, as normally employed in practice. In general, the value of $R_2$ will be chosen to represent the mean value between the open and the shorted diode bridge resistance and, for the purpose of this example, may be taken to be 5,000 ohms. Now, when the diode bridge is effectively conducting, that is, switch 15*a* is in its closed or shorting position, current will pass, considering FIGURE 1, from the B+ terminal and resistor 18 through diode 19 to ground in one path and, through diode 20 to the resistor network in the other path. Any difference in the forward voltage drop across the two diodes causes the resistor network to be placed at a "ground" potential by the diode bridge which differs from the actual ground seen by diode 19, with, as will be shortly explained, a resulting inaccuracy in the output reading.

This difference in the forward drop across the two diodes is most generally occasioned by the front current passed through diode 20 varying as a direct function of the input voltage $E_{in}$ magnitude while the front current through diode 19 to ground is relatively constant. Accordingly, the ground potential applied to the resistor network by the diode bridge varies from true ground as a function of the forward current through diode 20. If, for example, 10 volts were applied across the input of the FIGURE 4 circuit and, from FIGURE 1, diode 20 had a .1 volt greater drop across it than the other diode 19 due to a heavier front current, an inaccuracy of .1 part in 10 is thereby introduced, coresponding to a 1 percent accuracy in this part of the overall circuit.

However, a considerable improvement over conventional practice, as described above, is made by employing the second diode bridge in parallel with the first. For example, continuing the example given above, the .1 volt inaccuracy in the bridge 15 output, represented by the junction between resistors $R_2$ and $R_3$ being at +.1 volt above ground rather than at ground, will be substantially reduced since only .1 volt, rather than the input $E_{in}$ voltage, need be reduced to the ground potential by current flowing through diode 20*a*. Hence, the current flow through diodes 19*a* and 20*a* will be substantially equal, and with equal diode current flows, substantially equal voltage drops across each will result.

This means then that the junction point of resistors $R_3$ and $R_4$ will be placed, by bridge 16, at a point extremely close to true ground and can be made extremely close by matching the front conducting characteristics of diodes 19*a* and 20*a*. Thus, the second bridge effectively overcomes the previously noted inaccuracy inherent with only one bridge, i.e. diode bridge 15, and enables resistor network 24 to operate in practice as would be the case with diodes with idealized characteristics, that is, no effective front resistance.

It will be appreciated by those skilled in the art that the specific circuit configurations and combinations shown represent only one of several variations capable of producing substantially the same results as herein described without involving invention. For example, the number and placements of the various D.-C. amplifiers with their inverting or non-inverting properties, may be readily modified and still obtain the stated results without involving invention. It will also be appreciated that the various circuits, given in block diagrammatic form, may individually take many detailed embodiments as are known in the art and found in various textbooks, periodicals, etc., without involving invention.

Finally, it will be appreciated by those skilled in the art, that the foregoing description relates only to one detailed preferred embodiment of the present invention whose scope and spirit are set forth in the embodied claims.

What is claimed is:

1. In combination: first and second means for producing first and second signals, respectively; third means responsive to an applied signal for passing the signal applied thereto; normally inoperative means responsive when actuated for inverting an applied signal and passing twice the inverted amplitude of the signal applied thereto; means for applying said first signal as an input to said third means and said normally inoperative means; fourth means responsive to an applied signal of at least a predetermined magnitude for actuating said normally inoperative means; means for applying said second signal as an input to said fourth means; and output means for averaging the signals passed by said third means and said normally inoperative means to produce an output signal, said output signal representing a function of the magnitude of said first signal and the duration of said second signal above said predetermined magnitude.

2. In combination: first and second means for producing first and second signals, respectively, said first signal produced by said first means being a D.-C. signal, the information in said first signal being represented by its magnitude, and the second signal produced by said second means being of a two-level rectangular waveform configuration, the information in said second signal being represented by the duration of one of said levels relative to the duration of the other of said levels, said one level being above said predetermined magnitude; third means responsive to an applied signal for passing said applied signal; normally inoperative means responsive when actuated for inverting an applied signal and passing twice the inverted amplitude of said applied signal; means for applying said first signal to said third means and said normally inoperative means; means responsive to an applied signal of at least a predetermined magnitude for actuating said normally inoperative means; means for applying the said second signal to the last-named means; and output means for averaging the signals passed by said third means and said normally inoperative means to produce an output signal, said output signal representing a function of the magnitude of said first signal and the duration of said second signal above said predetermined magnitude, whereby said output signal represents the product of the information contained in said first and second signals.

3. In combination: first and second means for producing first and second signals, respectively, said first signal produced by said first means being a D.-C. signal representing one input function, and said second means includes, in addition, means for producing a pair of A.-C. signals of substantially the same frequency, the phase difference between said pair of A.-C. signals representing another input function, and means for converting the phase difference appearing each cycle between said pair of A.-C. signals into a signal having a voltage level of at least said predetermined magnitude, the last-named signal being of less than said predetermined magnitude during the remaining portion of each cycle; third means responsive to an applied signal for passing said applied signal; normally inoperative means responsive when actuated for inverting an applied signal and passing twice the inverted amplitude of said applied signal; means for applying said first signal to said third means and said normally inoperative means; means responsive to an applied signal of at least a predetermined magnitude for actuating said normally inoperative means; means for applying the said second signal to the last-named means; and output means for averaging the signals passed by said third means and said normally inoperative means to produce an output signal, said output signal representing a function of the magnitude of said first signal and the duration of said second signal above said predetermined magnitude, whereby said output signal represents the product of the phase difference between said pair of A.-C. signals and said first D.-C. signal.

4. An electronic unit for performing an arithmetic operation on the information contained in the phase difference between a pair of A.-C. input signals and a first D.-C. input voltage, said electronic unit comprising: means responsive to the application of a pair of input signals for producing an output signal representing the average thereof; means for normally coupling a predetermined portion of said input D.-C. signal to the first-named means; normally inoperative means responsive when actuated for coupling twice the predetermined portion of said input voltage but reversed in polarity therefrom to the first-named means; and means responsive each cycle to the phase difference between said pair of input A.-C. signals for actuating said normally inoperative means whereby the magnitude of the output signal from said first-named means represents the results of an arithmetic operation on the information contained in the phase difference between said pair of A.-C. input signals and said input D.-C. voltage.

5. An electronic multiplier for multiplying the information contained in the phase difference between a pair of input A.-C. signals and a D.-C. input voltage, said electronic multiplier comprising: means for converting the phase difference between the pair of A.-C. signals into a two-leveled signal, the duration of one level in said two-leveled signal relative to the duration of the other level corresponding to the phase difference; first output means responsive to one level of said two-level signal for producing an output signal corresponding in magnitude and polarity to said D.-C. input voltage; second output means responsive to the other level of said two-level signal for producing an output signal corresponding in magnitude to said D.-C. input voltage, but inverted in polarity therefrom, the relative durations of the signals produced by said first and second output means corresponding to said phase difference; and means for combining and filtering the output signals produced by said first and second output means whereby an output D.-C. voltage is produced which corresponds to the product of said phase difference and D.-C. input voltage.

6. An electronic multiplier for multiplying the information contained in the phase difference between a pair of input signals and a D.C. input voltage, said electronic multiplier comprising: output means responsive to a pair of applied signals for averaging and filtering said signals to produce an output signal; means for reversing the polarity of said D.-C. input signal and applying the resulting signal as one input signal to said output means; means for producing a first voltage level whose duration in each cycle measured by said pair of input signals corresponds to the phase lag therebetween; and means responsive to the first voltage level produced each cycle by the last-named means for doubling the magnitude of said D.-C. input voltage and applying the resulting signal to said output means whereby said output signal represents the product of the D.C. input signal and the phase difference between said pair of input signals.

7. An analog electronic multiplier for multiplying the information contained in the magnitude of a D.-C. signal by the information contained in the relative duration of a first voltage level to the second voltage level in an A.-C. input signal of rectangular waveform, said multiplier comprising: output averaging means responsive to the receipt of input signals for producing an output signal corresponding to the averaged value thereof; first conductive means for coupling said applied input D.C. signal to said output means; second conductive means for normally coupling twice the magnitude of said D.-C. input voltage but inverted in polarity therefrom to said output averaging means whereby the output signal of said output averaging means normally corresponds to said input D.-C. signal but inverted in polarity therefrom; electronic switching means coupled between said second conductive means and ground and responsive to the receipt of a first voltage level for substantially grounding said second conductive means; and means for applying said A.-C. input signal to said electronic switching means whereby only said D.-C. signal is applied to said output averaging means during the appearance of said first voltage level in the A.-C. input signal and the inverse of said D.-C. voltage is applied during the appearance of said second voltage level in said A.-C. input signal, the output signal produced by said output averaging means representing the product of said D.-C. signal and the relative duration of said first to said second voltage levels in said A.-C. input signal.

8. The electronic multiplier according to claim 7 further including additional electronic switching means similar to said electronic switching means coupled between said second conductive means and ground, and means for coupling said A.-C. input signal to said additional electronic switching means whereby said second conductive means is grounded by the operation of said electronic switching means and said additional electronic switching means during the appearance of said first voltage level in said input A.-C. signal with the grounding action produced by said additional conductive means representing an improvement over that normally produced by only said electronic switching means with a subsequent improvement of multiplication accuracy.

9. An analog electronic multiplier for multiplying the information contained in the magnitude of a D.-C. signal by the information contained in the relative duration of a first voltage level to the second voltage level in an A.-C. input signal of rectangular waveform, said multiplier comprising: output averaging means responsive to the receipt of input signals for producing an output signal corresponding to the averaged value thereof; first conductive means for coupling said applied in input D.-C. signal to said output means; second conductive means for normally coupling twice the magnitude of said D.-C. input signal but inverted in polarity therefrom to said output averaging means whereby the output signal of output averaging means normally corresponds to said input D.-C. signal but inverted in polarity therefrom; first electronic switching means coupled between a first point in said second conductive means and ground and responsive to the receipt of a first voltage level for reducing twice the magnitude of said D.-C. input voltage normally coupled by said second conductive means to said output averaging means to a voltage slightly above ground potential; second electronic switching means coupled between a second point in said second conductive means and ground and responsive to the receipt of a first voltage level simultaneously when said first electronic switching means receives said first voltage level for reducing the voltage slightly above ground potential at said first point to substantially ground potential whereby the simultaneous operation of said first and said second electronic switching means reduces twice the magnitude of said input D.-C. signal normally coupled by said second conductive means to said output averaging means to substantially ground potential; and means for applying said A.-C. input signal to said first and second electronic switching means whereby only said D.-C. signal is applied to said output averaging means during the appearance of said first voltage level in the A.-C. input signal and the inverse of said D.-C. voltage is applied during the appearance of said second voltage level in said A.-C. input signal, the output signal produced by said output averaging means representing the product of said D.-C. signal and the relative duration of said first to said second voltage levels in said A.-C. input signal.

10. The analog electronic multiplier according to claim 9 wherein said electronic switching means and said additional electronic switching means are diode bridge means.

11. An analog multiplier circuit for producing an output D.-C. signal representing the product of the phase difference between a pair of input A.-C. signals and an applied input D.-C. signal, said multiplier comprising: means responsive to said pair of input A.-C. signals for producing a first A.-C. signal of rectangular waveform having first and second voltage levels, the duration of said first voltage level corresponding to the phase displacement between said pair of input A.-C. signals; means for producing a second A.-C. signal complementary to said first A.-C. signal; first and second diode gating means, each of said gating means having first and second input terminals and a pair of output terminals and responsive to first and second signal levels applied to its said first and second input terminals, respectively, for substantially shorting its said pair of output terminals together and responsive to said second and first voltage levels applied to its said first and second input terminals, respectively, for decoupling its said pair of output terminals; output filtering means; first conduction means coupled to said output filtering means; means for doubling the said D.-C. input voltage and reversing the polarity thereof; means for applying the voltage produced by the last-named means to said first conduction means whereby twice the amplitude of said D.-C. signal but reversed in polarity therefrom is normally applied to said output filtering means; means for applying said input D.-C. signal directly to said output filtering means whereby the output signal of said output filtering means is normally the magnitude of said input D.-C. signal but reversed in polarity therefrom; means for grounding one output terminal of said pair of output terminals of each of said first and second diode gating means; means for applying said first and said second A.-C. signals to the pair of input terminals, respectively, of each of said first and second diode gating means; means for coupling the other output terminal of said first diode gating means to a first point on said first conduction means whereby the potential of said first point is placed slightly above ground potential during the appearance of said first and second voltage levels in said first and second A.-C. signals, respectively; and means for coupling the other output terminal of said second diode gating means to a second point on said first conduction means whereby the slightly above ground potential of said first point is lowered to ground potential at said second point during the appearance of said first and second voltage levels in said first and second A.-C. signals, respectively, with only said D.-C. input signal being applied to said output filtering means, the output signal produced by said output filtering means representing the product of the D.-C. input signal and the phase difference between the pair of input A.-C. signals.

References Cited by the Examiner

UNITED STATES PATENTS

| | | | |
|---|---|---|---|
| 2,275,191 | 11/1955 | Ham | 235—183 |
| 3,017,109 | 1/1962 | Briggs | 235—194 |
| 3,028,487 | 4/1962 | Losse | 307—88.5 |
| 3,029,386 | 4/1962 | Ricker. | |
| 3,043,516 | 7/1962 | Abbott et al. | 235—183 X |
| 3,141,969 | 7/1964 | Brendle | 235—193 |
| 3,202,807 | 8/1965 | Sikorra | 235—194 |

MALCOLM A. MORRISON, *Primary Examiner.*

I. KESCHNER, *Assistant Examiner.*